United States Patent [19]

Yoshida

[11] Patent Number: 5,446,480
[45] Date of Patent: Aug. 29, 1995

[54] INPUT DEVICE FOR ENTERING DATA FOR ELECTRONIC EQUIPMENTS AND SO FORTH

[75] Inventor: Tadao Yoshida, Kanagawa, Japan

[73] Assignee: Sony Corporation, Japan

[21] Appl. No.: 885,234

[22] Filed: May 20, 1992

Related U.S. Application Data

[63] Continuation of Ser. No. 564,727, Aug. 9, 1990, abandoned.

[30] Foreign Application Priority Data

Aug. 17, 1989 [JP] Japan .................. 1-210671

[51] Int. Cl.$^6$ .......................................... G09G 3/02
[52] U.S. Cl. ................................ 345/157; 345/174; 178/18
[58] Field of Search ............... 340/706, 709, 710, 712; 341/31, 34; 178/18, 19; 345/157, 156, 159, 160, 161, 163, 173, 174, 145, 184

[56] References Cited

U.S. PATENT DOCUMENTS

| 4,092,532 | 5/1978 | Hayes | 340/710 |
|---|---|---|---|
| 4,435,616 | 3/1984 | Kley | 178/18 |
| 4,484,026 | 11/1984 | Thornburg | 178/18 |
| 4,550,316 | 10/1985 | Whetstone et al. | 340/709 |
| 4,575,580 | 3/1986 | Jandrell | 178/18 |
| 4,670,743 | 6/1987 | Zemke | 340/706 |
| 4,766,425 | 8/1988 | Tallman et al. | 341/31 |
| 4,782,327 | 11/1988 | Kley et al. | 250/221 |
| 4,814,760 | 3/1989 | Johnston et al. | 345/173 |
| 4,862,151 | 8/1989 | Grauz et al. | 340/706 |
| 4,897,511 | 1/1990 | Itaya et al. | 178/18 |
| 4,929,934 | 5/1990 | Ueda et al. | 340/206 |
| 4,998,014 | 3/1991 | Hasegawa | 341/31 |
| 5,012,230 | 4/1991 | Yasuda | 340/709 X |

FOREIGN PATENT DOCUMENTS

| 3045133 | 7/1982 | Germany | 345/167 |
|---|---|---|---|
| 3830933 | 10/1989 | Germany . | |
| 54-119899 | 9/1979 | Japan | 345/173 |
| 0027282 | 2/1983 | Japan | 340/706 |
| 0039282 | 3/1985 | Japan | 340/706 |
| 2139762 | 11/1984 | United Kingdom | 345/173 |

*Primary Examiner*—Tommy P. Chin
*Assistant Examiner*—A. Au
*Attorney, Agent, or Firm*—Ronald P. Kananen

[57] ABSTRACT

An input device for moving a cursor to a desired point in a display has a sliding member which moves on a two dimensional coordinate system, a location detector which electrically detects the location of the sliding member within that coordinate system, and a switch to allow data entry in correspondence to the desired point indicated in the display corresponding to the position of the sliding member, in response to depression of the sliding member in a direction perpendicular to the plane of the coordinate system.

6 Claims, 3 Drawing Sheets

INPUT DEVICE FOR ENTERING DATA FOR ELECTRONIC EQUIPMENTS AND SO FORTH

This application is a continuation of application Ser. No. 07/564,727 filed Aug. 9, 1990, now abandoned.

BACKGROUND OF THE INVENTION

1. Field of the Invention

The present invention relates generally to an input device which can be used for entry of data for electronic equipment and so forth. More specifically, the invention relates to an input device, particularly one adapted to enter operational data, such as data at a desired location of the cursor and so forth, into a personal computer or so forth.

2. Description of the Background Art

Personal computers and other image processing equipment are provided with manually operable input devices, such as a mouse, light pen, tablet, joy-stick and so forth, for entry of a variety of data, such as identification data for the coordinates of a point in a display to be pointed to. Such input devices enable the operator to easily input data by moving the curser or the location identifying mark to a desired position. The input devices are known to be convenient for use because of the capability of direct access of the display screen for identifying the location at which to input data.

Such known input devices are generally adapted for electronic equipment with a relatively large display screen, such as a desk-top type personal computer, and so forth. A difficulty is encountered for such known input devices when applied to compact electronic equipment, such as a hand-held digitizer, pocket-size game computer or lap-top type personal computer, because of the display screen being too small.

SUMMARY OF THE INVENTION

Therefore, it is an object of the present invention to provide an input device which is applicable even for electronic equipment with a small display screen.

A further object of the invention is to provide an input device which can be built into a compact equipment, such as a hand-held computer, a hand-held digitizer, a hand-held type or pocket-size type game computer and so forth.

In order to accomplish the aforementioned and other objects, an input device, according to the present invention, has a sliding member so constructed as to move on a two dimensional coordinate system, a location detecting means which electrically detects the location of the sliding member within the coordinate system, and a switching means for switching in response to depression of the sliding member in a direction perpendicular to the plane on the coordinate system.

According to one aspect of the invention, an input device comprises:

a sliding member disposed on a two-dimensional coordinate system which is established in correspondence with a coordinate system of a display, the sliding member being movable on the two-dimensional coordinate system for identifying the coordinate position in the coordinate system of the display, the sliding member being further operable in a direction perpendicular to the two-dimensional coordinate system for providing a data entry command force;

a detector associated with the sliding member for detecting the coordinate position of the sliding member on the two-dimensional coordinate system, the detector generating a sliding member position indicative signal having a first component representative of a first coordinate position of the sliding member on a first coordinate axis of the two-dimensional coordinate system and a second component representative of a second coordinate position of the sliding member on a second coordinate axis of the two-dimensional coordinate system; and a switching means responsive to the data entry command force for permitting entry at a location on the display corresponding to the sliding member coordinate position on the two-dimensional coordinate system identified by the sliding member position indicative signal.

Preferably the detector comprises a pair of flat plate form resistors and an electrically conductive sheet disposed therebetween. In the alternative, the detector may comprise a light array formed by a plurality of first light beams transferred between a plurality of first light emitting means and a plurality of photo sensing means in a first direction parallel to the first coordinate axis, and a plurality of second light beams transferred between a plurality of second light emitting means and a plurality of photo sensing means in a second direction parallel to the second coordinate axis.

The switching means may be provided on the sliding member.

According to another aspect of the invention, a display control system for an electric equipment which has a visual display for displaying information, the display having a movable marking identifying the display position to access for entry of data and/or a command thereto, the system comprising:

a sliding member disposed on a two-dimensional coordinate system which is established in correspondence with a coordinate system of the display, the sliding member being movable on the two-dimensional coordinate system for identifying the coordinate position in the coordinate system of the display, the sliding member being further operable in a direction perpendicular to the two-dimensional coordinate system for providing a data entry command force;

a detector associated with the sliding member for detecting the coordinate position of the sliding member on the two-dimensional coordinate system, the detector generating a sliding member position indicative signal having a first component representative of a first coordinate position of the sliding member on a first coordinate axis of the two dimensional coordinate system and a second component representative of a second coordinate position of the sliding member on a second coordinate axis of the two-dimensional coordinate system; and a switching means responsive to the data entry command force for permitting entry at a location on the display corresponding to the sliding member coordinate position on the two-dimensional coordinate system identified by the sliding member position indicative signal.

BRIEF DESCRIPTION OF THE DRAWINGS

The present invention will be understood more fully from the detailed description given herebelow and from the accompanying drawings of the preferred embodiment of the invention, which, however, should not be taken to limit the invention to the specific embodiment but are for explanation and understanding only.

In the drawings.

DESCRIPTION OF THE PREFERRED EMBODIMENT

Figure 1:
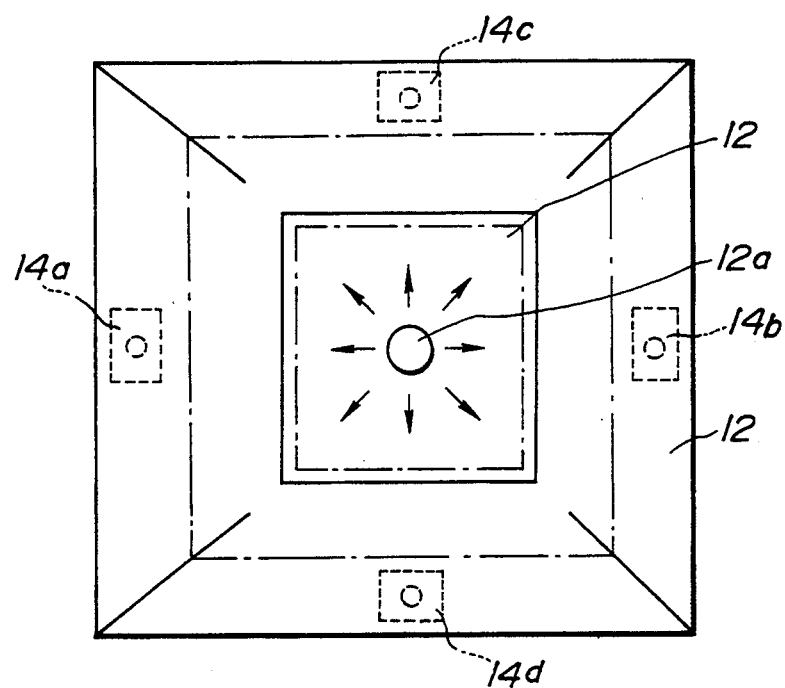
FIG. 1 is a plan view of the preferred embodiment of an input device according to the present invention.
Figure 2:
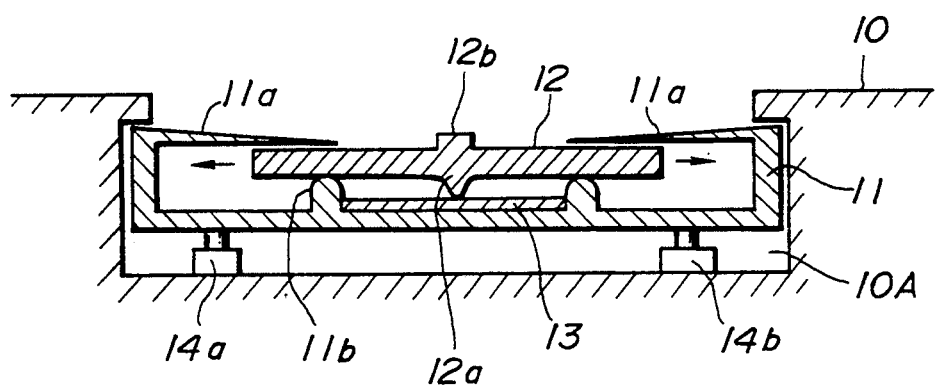
FIG. 2 is a cross section of the preferred embodiment of the input device of FIG. 1.

Referring now to the drawings, particularly to FIGS. 1 and 2, the preferred embodiment of an input device, according to the present invention, is designed to be installed within a recess 10A formed in a front face 10 of an electronic equipment. The input device has a hollow casing 11. A sliding member 12 is disposed within the interior space of the casing for movement on a two-dimensional coordinate system defined by x- and y-axes. A location detector 13 is also disposed within the interior space of the casing 11. The location detector 13 has a detector surface oriented parallel to the plane on which the two-dimensional coordinate system is established. As can be seen, the casing 11 is mounted on a plurality of depression switches 14a, 14b, 14c and 14d respectively arranged on the bottom of the recess 10A.

The casing 11 has an elastically deformable upper wall 1 la having a smaller thickness than the remaining part of the casing. The casing 11 is also formed with guide projections 11b which are projected from the bottom wall of the casing and have rounded tops. The guide projections 11b are placed at locations radially distanced from the center of the casing 11 for defining a clearance for receiving therein the location detector 13. The sliding member 12 is thus held between the upper wall 1 la and the guide projections 11b. Therefore, the two-dimensional coordinate system on which the sliding member moves is defined therebetween.

The sliding member 12 is formed with a downward projection 12a having a lower end maintained in contact with the detector surface of the location detector 13. For assuring sliding contact between the lower end of the projection 12a of the sliding member 12 and the detector surface of the location detector 13, a given magnitude of downward force may be exerted on the sliding member by means of the upper wall 11a. The sliding member 12 also has an upward projection 12b which is designed to be touched or accessed by the operator's finger.

With the shown construction, the slider member 12 is operated on the two-dimensional coordinate system for data entry along x- and y-axes as shown by arrows in FIGS. 1 and 2.

On the other hand, the switches 14a, 14b, 14c and 14d are designed to sense a depression force greater than the force required for sliding motion of the sliding member 12. Namely, the switches 14a, 14b, 14c and 14d do not sense the operational force for slidingly moving the sliding member to the desired location, but they do sense the depression force which is greater than the operational force in the downward direction.

Figure 3:
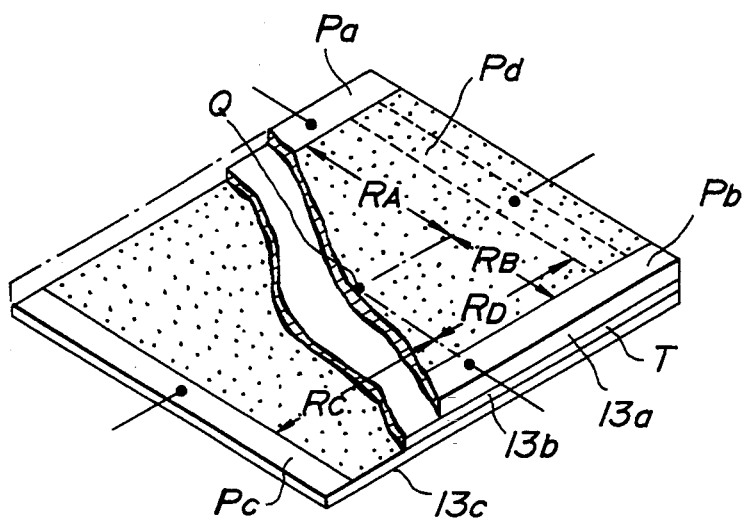
FIG. 3 is a perspective view of a location detecting component employed in the preferred embodiment of the input device of FIG. 1, which is illustrated in a partially cut-away form for explanatory purposes.

As shown in FIG. 3, the location detector 13 has a first resistor layer having a carbon layer on the lower surface, an electrically conductive layer 13b, such as a sheet or film which is disposed beneath the carbon layer, and a second resistor layer 13c which is oriented beneath the electrically conductive layer 13b. Similarly to the first resistor layer 13a, the second resistor layer 13c has a carbon layer on the upper surface. Strip form electrodes Pa and Pb are provided along two side edges of the first resistor layer 13a. Similarly, strip form electrodes Pc and Pd are provided along the side edges of the second resistor layer 13c. The pair of electrodes Pa and Pb are oriented in parallel relationship to each other and perpendicularly to the pair of the electrodes Pa and Pb as shown.

In the operation, the sliding member 12 is slidingly moved on the two-dimensional coordinate system for indicating or identifying the location in the coordinate system of display at which to enter data. Then, the downward projection 12a shifts along the x- and/or y-axes of the two-dimensional coordinate system to be placed at a location corresponding to the desired coordinates in the display coordinate system. The operator thus may operate the slider member 12 on the two-dimensional coordinate system while observing the display screen which has a visual mark at the data entry point, such as a curser or the equivalent thereof.

With the force exerted on the sliding member 12 for slidingly shifting its position on the two-dimensional coordinate system, the sliding member 12 is depressed with an operational force which is smaller than the depression force for the data entry as set forth above, in a direction transverse to the plane of the two-dimensional coordinate system, i.e. in the vertical direction. Here, it is assumed that the vertical force is exerted on the sliding member 12 at a point Q. The operational force is transmitted to the location detector 13 via the downward projection 12a. Then, at the location where the downward projection 12a is placed, the carbon layers of the first and second resistor layers 13a and 13c come into electrical contact with the conductive layer 13b. By this, the resistance between the pair of electrodes Pa and Pb is separated into components RA and RB at the point Q. Similarly, the resistance between the electrodes Pc and Pd are separated into components RC and RD at the point Q. Therefore, when a given voltage V is applied between the electrodes Pa and Pb, and between the electrodes Pc and Pd, the voltages between the lead terminal T of the conductive layer 13b and the electrodes Pa and Pc can be expressed by:

$$VQX = RB/(RA+RB)$$

$$VQY = RC/(RC+RD)$$

Here, the voltage VQX between the terminal T and the electrode Pa represents the x-axis coordinate of the point Q. Similarly, the voltage VQY between the terminal T and the electrode Pc represents the y-axis coordinate of the point Q. Then, the x- and y-axis coordinate representative voltages VQX and VQY are input to a control section of the electronic equipment via an analog-to-digital (A/D) converter. The control section thus accepts data entry for the point on the display having display coordinates corresponding to the point Q.

After setting the marking on the display screen at a desired data entry point, the sliding member 12 is depressed with a depression force, which is greater than the operational force. As a result, at least one of the switches 14a, 14b, 14c and 14d is switched to the ON position. The control section is responsive to the turning ON of one of the switches 14a, 14b, 14c and 14d for accepting data, such as graphic data, character data and so forth at the designated point on the display.

Figure 4:
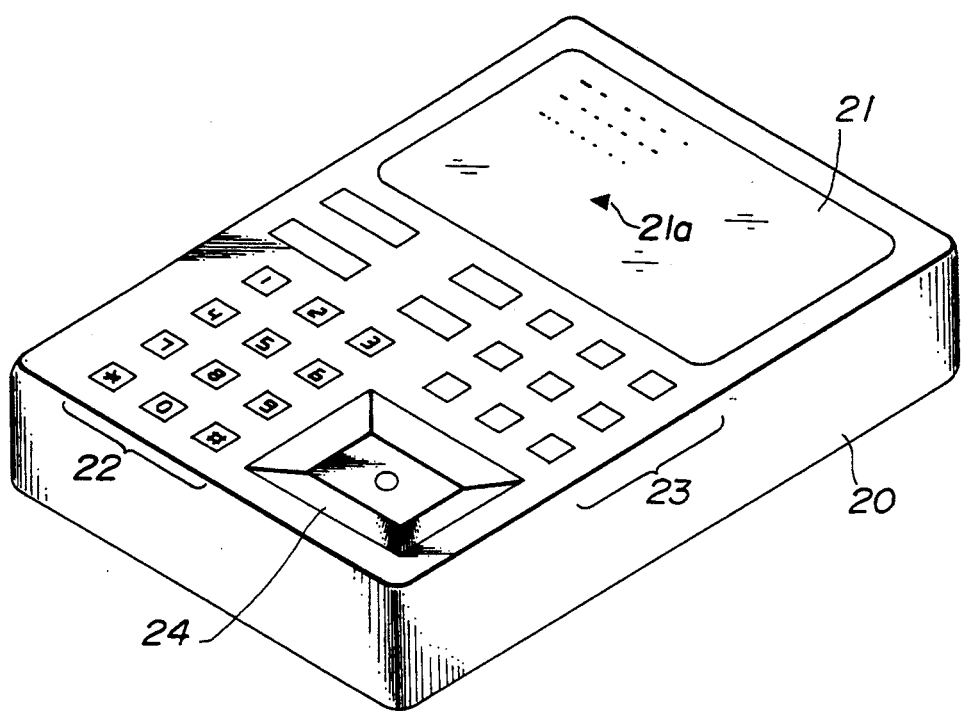
FIG. 4 is a perspective view of one example of application of the preferred embodiment of the input device for an electronic equipment.

FIG. 4 shows one example of application of the shown embodiment of the input device for a hand-held type electric equipment. As can be seen from FIG. 4, the preferred embodiment of the input device is built into a casing of the electric equipment 20. In the shown example, the equipment 20 has a display 21, a ten-key array 22, a function key array 23 and the preferred embodiment of the input device as generally represented by the reference numeral "24". In the shown construction, the input device 24 may be used for shifting a triangular cursor 21a on the display screen on the display coordinate system for identifying the data entry point.

Though FIG. 4 shows one example of the hand-held type electronic equipment for which the input device according to the present invention is applicable, the layout of the operational keys and the layout of the display are not at all essential to the subject matter of the invention. Therefore, the shown embodiment of the input device may be applicable to any key and display arrangement for hand-held electronic equipment. Furthermore, since the shown embodiment of the input device can be compact, it is also applicable for lap-top type personal computers and equivalents thereof.

Figure 5:
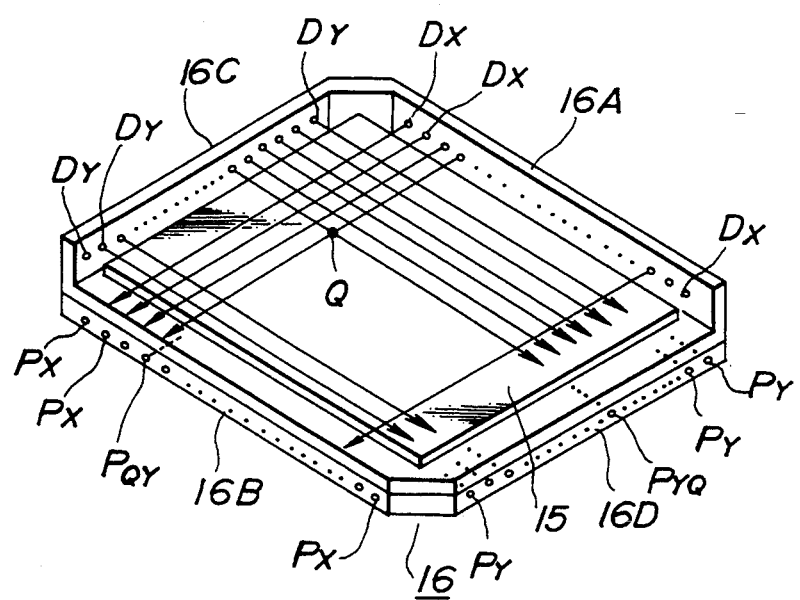
FIG. 5 is a perspective view of another construction of the location detecting component to be employed in the preferred embodiment of the input device of FIG. 1.

FIG. 5 is a perspective view of another construction of the location detector 13 which is also applicable for the shown embodiment of the input device. In the shown construction, the location detector 13 includes a sheet switch 15 which is formed as a pressure sensitive switch. The sheet switch 15 is disposed within a detector casing 16 with a vertical wall section 16A, 16B, 16C and 16D. A plurality of light emitting diodes Dx are arranged on the vertical wall section 16A. The diodes Dx are arranged in alignment along the horizontal edge of the vertical wall section at given regular intervals. On the vertical wall 16B opposite to the vertical wall section 16A, a plurality of photo diodes Px are provided in horizontal alignment at regular intervals. Each of the photo diodes Px are designed to receive light emitted from a corresponding one of the light emitting diodes Dx. Similarly, a plurality of light emitting diodes are arranged on the vertical wall section 16C. The diodes Dy are arranged in alignment along the horizontal edge of the vertical wall section at given regular intervals. On the vertical wall 16D opposite to the vertical wall section 16C, a plurality of photo diodes Py are provided in horizontal alignment at regular intervals. Each of the photo diodes Py are designed to receive light emitted from a corresponding one of the light emitting diodes Dy. Therefore, as will be appreciated, a light array is formed in the location detector 13. As can be appreciated, the plurality of light beams transferred between the light emitting diodes Dx and the photo diodes Px in parallel to the x-axis of the two-dimensional coordinate system serve for detecting the y-axis coordinate of the sliding member. Similarly, the plurality of light beams transferred between the light emitting diodes Dy and the photo-diode Py in parallel to the y-axis of the coordinate system for detecting the x-axis coordinate. With these light beams in the x- and y-axis directions, a light array for determining position is established.

In the shown embodiment, by depressing the downward projection 12a at a position Q on the sheet switch, one of the light beams along the x-axis and one of the light beams along the y-axis are interfered with by the projection 12a. Since each light beam represents an x- or y-axis coordinate, the position of the projection 12a can be identified by detecting the light beams interfered with. For entry of data, the sheet switch is depressed with the depression force so that the force exerted onto the sheet switch becomes greater than a respective criterion of the sheet switch. By this, detection of the coordinate position of the sliding member can be done.

While the present invention has been discussed in terms of the preferred embodiment of the invention, the disclosed embodiments are to be taken as for facilitating a better understanding of the invention. The invention may be implemented in various fashions. Therefore, any possible embodiments and modifications of the embodiments which can be implemented without departing from the principles of the invention which are well defined in the appended claims, are to be regarded within the scope of the invention.

For example, though the specific types of the location detectors are discussed in the disclosure, the location detector may be replaced with any other type of sensor or the like which can achieve the equivalent results to those discussed herein. Also, it is possible to provide the switch for entry of data on the sliding member.

What is claimed is

1. A hand-held type electronic equipment for identifying a two-dimensional coordinate position for use with a display, said electronic equipment comprising:
  an input device including a sliding member and switch means and a detector, said input device providing a two-dimensional coordinate system to identify first and second coordinates of said sliding member on said two-dimensional coordinate system, said sliding member being movable on said two-dimensional coordinate system by a respective positioning force applied thereto, said switch means being operatively associated with said two-dimensional coordinate system in order to be selectively actuated by a respective data entry command force exerted on said sliding member when said sliding member is at a desired position on said two-dimensional coordinate system, said detector providing information corresponding to said first and second coordinates of said sliding member in said two-dimensional coordinate system when said data entry command force is exerted on said sliding member;
  said detector including a parallel and opposed pair of flat plate resistors and an electrically conductive sheet disposed therebetween, wherein said information corresponding to said first and second components corresponds to continuous values for said position of said sliding member in said two-dimensional coordinate system; function keys for data and/or command input in correspondence to said position in said display corresponding to said desired position of said sliding member on said two-dimensional coordinate system;
  a main body with a display and a keyboard, an integral combination of said input device with said sliding member, detector and switching means and of said main body with said display and keyboard being provided, said input device being provided in a cavity in said main body;

said input device further comprising:
said sliding member having a pushing means on a top surface thereof, for receiving said positioning force for moving said sliding member on said two-dimensional coordinate system of said input device, and a projection means on a bottom surface thereof which continuously contacts a top surface of a top one of said flat plate resistors;
a casing which holds said sliding member, said casing including side edges that limit said sliding member to move on said two-dimensional coordinate system of said input device within a predetermined area corresponding to the area of said display, a flexible top surface which bears on a top surface of said sliding member, said flexible top surface having an opening therein for providing access to said pushing means for moving said sliding means, and a bottom surface which supports from below said sliding member and said detector at a central part of said casing, so that said detector detects the position of said projection means on said bottom surface of said sliding member; and
said switching means includes a plurality of switches mounted between the bottom of said cavity and a bottom exterior surface of said casing, said plurality of switches being distributed around the periphery of said casing and outside of said central part thereof.

2. The hand-held type electronic equipment according to claim 1, said display comprising an LCD display having a movable mark therein for identifying said desired position in said display corresponding to said first and second coordinates of said sliding member on said two-dimensional coordinate system of said input device.

3. The hand-held type electronic equipment according to claim 1, wherein said input device is such that:
said entry command force is applied approximately perpendicularly to said two-dimensional coordinate system of said input device; and
said respective positioning force can easily include a component roughly parallel to said two-dimensional coordinate system of said input device which is sufficient to move said sliding member without having a component transverse to said two-dimensional coordinate system of said input device which is equal to or greater than said entry command force.

4. An input device comprising:
a casing having an upper wall;
a sliding member having a projection extending from a lower surface thereof, said sliding member disposed within said casing on a two-dimensional coordinate system corresponding with a coordinate system of a display, said sliding member being movable on said two-dimensional coordinate system for identifying a desired coordinate position in said coordinate system of said display; and
a detector disposed within said casing beneath said sliding member, said detector including a pair of parallel and opposed flat plate resistors and an electrically conductive sheet disposed therebetween;
said upper wall of said casing being elastically deformable and engaging said sliding member, said elastically deformable upper wall biasing said projection on said sliding member into continuous sliding contact with said detector; and said input device further comprising a switching means responsive to a data entry command force applied to said sliding member in a direction perpendicular to said two-dimensional coordinate system, said switching means including a plurality of switches mounted beneath a bottom exterior surface of said casing.

5. An input device comprising:
a sliding member disposed on a two-dimensional coordinate system which is established in correspondence with a coordinate system of a display, said sliding member being movable on said two-dimensional coordinate system for identifying a desired coordinating position in said coordinate system of said display, said sliding member being further operable in a direction perpendicular to said two-dimensional coordinate system by a data entry command force exerted upon said sliding member;
a detector associated with said sliding member for detecting the coordinate position of said sliding member on said two-dimensional coordinate system, said detector generating a sliding member position indicative signal having a first component representative of a first coordinate position of said sliding member on a first coordinate axis of said two-dimensional coordinate system and a second component representative of a second coordinate position of said sliding member on a second coordinate axis of said two-dimensional coordinate system;
a switching means responsive to said data entry command force for permitting data entry at said desired position on said display identified by said sliding member position indicative signal; and
said detector including a parallel and opposed pair of flat plate resistors and an electrically conductive sheet disposed therebetween, wherein, said first and second components of said sliding member position indicative signal generated by said detector correspond to continuous values for said position of said sliding member in said two-dimensional coordinate system;
said flat plate resistors with said conductive sheet therebetween being provided below a bottom surface of said sliding member, and said bottom surface of said sliding member having a projection which extends to continuously contact a top surface of a top one of said flat plate resistors, said two flat plate resistors both contacting said conductive sheet beneath said projection;
said input device further comprising a main body and a keyboard, wherein an integral combination of said sliding member, detector, switching means, display and said keyboard is provided, said input device being provided in a recess in said main body;
said sliding member having a pushing means on a top surface thereof, for receiving a positioning force for moving said sliding member on said two-dimensional coordinate system of said input device;
a hollow casing which holds said sliding member, said casing including side edges that limit said sliding member to move on said two-dimensional coordinate system of said input device within a predetermined area corresponding to the area of said display, a flexible top surface which bears on a top surface of said sliding member, said flexible top surface having an opening therein for providing access to said pushing means for moving said sliding means, and a bottom surface which supports from below said sliding member and said detector at a central part of said casing, so that said detector detects the position of said position on said bottom surface of said sliding member; and said switching means includes a plurality of switches mounted between the bottom of said recess and a bottom exterior surface of said casing, said plurality of switches being distributed around the periphery of said casing and outside of said central part thereof, any one or more of said switches switching when said entry command force is provided sufficiently strongly.

6. An input device comprising:

a casing having an upper wall;

a sliding member having a projection extending from a lower surface thereof, said sliding member disposed within said casing on a two-dimensional coordinate system corresponding with a coordinate system of a display, said sliding member being movable on said two-dimensional coordinate system for identifying a desired coordinate position in said coordinate system of said display;

a detector disposed within said casing beneath said sliding member for detecting the coordinate position of said sliding member on said two-dimensional coordinate system, said detector including a pair of parallel and opposed flat plate resistors and an electrically conductive sheet disposed therebetween; and a switching means responsive to a data entry command force applied to said sliding member in a direction perpendicular to said two-dimensional coordinate system, said switching means including a plurality of switches mounted beneath a bottom exterior surface of said casing;

wherein said upper wall of said casing is elastically deformable and engages said sliding member, said elastically deformable upper wall biasing said projection on said sliding member into continuous sliding contact with said detector.

* * * * *